(12) United States Patent
Linck et al.

(10) Patent No.: US 11,573,848 B2
(45) Date of Patent: Feb. 7, 2023

(54) IDENTIFICATION AND/OR PREDICTION OF FAILURES IN A MICROSERVICE ARCHITECTURE FOR ENABLING AUTOMATICALLY-REPAIRING SOLUTIONS

(71) Applicant: International Business Machines Corporation, Armonk, NY (US)

(72) Inventors: Nicholas Linck, San Jose, CA (US); Sangeetha Seshadri, Plano, CA (US); Paul Henri Muench, San Jose, CA (US); Umesh Deshpande, San Jose, CA (US); Priyaranjan Behera, Santa Clara, CA (US); Wilfred Edmund Plouffe, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/094,666

(22) Filed: Nov. 10, 2020

(65) Prior Publication Data

US 2022/0147409 A1    May 12, 2022

(51) Int. Cl.
   *G06F 11/00* (2006.01)
   *G06F 11/07* (2006.01)
   (Continued)

(52) U.S. Cl.
   CPC ........ *G06F 11/079* (2013.01); *G06F 11/0772* (2013.01); *G06F 11/0787* (2013.01); *G06F 11/326* (2013.01); *G06K 9/6262* (2013.01)

(58) Field of Classification Search
   CPC . G06F 11/079; G06F 11/0787; G06F 11/3644
   See application file for complete search history.

(56) References Cited

U.S. PATENT DOCUMENTS 7,620,612 B1    11/2009  Vijendra et al.
9,842,045 B2    12/2017  Heorhiadi et al.
(Continued)

OTHER PUBLICATIONS

Zhou et al., "Latent Error Prediction and Fault Localization for Microservice Applications by Learning from System Trace Logs," Proceedings of the 2019 27th ACM Joint Meeting on European Software Engineering Conference and Symposium on the Foundations of Software Engineering, Aug. 2019, 12 pages.
(Continued)

*Primary Examiner* — Philip Guyton
(74) *Attorney, Agent, or Firm* — Zilka-Kotab, P.C.

(57) ABSTRACT

A computer-implemented method according to one embodiment includes causing a failure event in each of a plurality of microservices of a system and collecting failure effect data associated with the caused failure events. A mapping is created detailing transition of the microservices between different states and the collected failure effect data is analyzed for creating the mapping. The method further includes outputting a predetermined notification in response to a determination that a first of the microservices is close to experiencing a predicted failure event, and outputting a suggested solution for repairing the system in response to a determination that the system has failed, using the mapping to identify a root cause of the system failure. Using the mapping to identify the root cause of the system failure includes identifying the microservices that caused the system failure.

20 Claims, 7 Drawing Sheets

(51) Int. Cl.
  *G06K 9/62* (2022.01)
  *G06F 11/32* (2006.01)

(56) References Cited

U.S. PATENT DOCUMENTS

| 10,528,450 | B2 | 1/2020 | Hassan |
| 10,684,940 | B1* | 6/2020 | Kayal ................. G06F 11/3664 |
| 2017/0046146 | A1 | 2/2017 | Jamjoom et al. |
| 2017/0250855 | A1* | 8/2017 | Patil ...................... H04L 41/064 |
| 2020/0366573 | A1* | 11/2020 | White ..................... H04L 43/50 |

OTHER PUBLICATIONS

Zwietasch, T., "Online Failure Prediction for Microservice Architectures," Master's Thesis, Institute of Software Technology, Reliable Software Systems, University of Stuttgart, Aug. 7, 2017, 105 pages.

Mohammed et al., "Failure Prediction using Machine Learning in a Virtualised HPC System and application," Cluster Computing, vol. 22, No. 2, 2019, pp. 471-485.

Forsberg, V., "Automatic Anomaly Detection and Root Cause Analysis for Microservice Clusters," Master ?Thesis, Umea University, 2019, 46 pages.

Power et al., "A Microservices Architecture for Reactive and Proactive Fault Tolerance in IoT Systems," IEEE 19th International Symposium on A World of Wireless, Mobile and Multimedia Networks, 2018, 6 pages.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Microservices, "Pattern: Log aggregation," Microservice Architecture, 2020, 2 pages, retrieved from https://microservices.io/patterns/observability/application-logging.html.

Swersky, D., "C# Logging best practices in 2019 with examples and tools," Raygun, Dec. 2018, 12 pages, retrieved from https://raygun.com/blog/c-sharp-logging-best-practices/.

Meng et al., "Localizing Failure Root Causes in a Microservice through Causality Inference," IEEE, 2020, pp. 1-10.

* cited by examiner

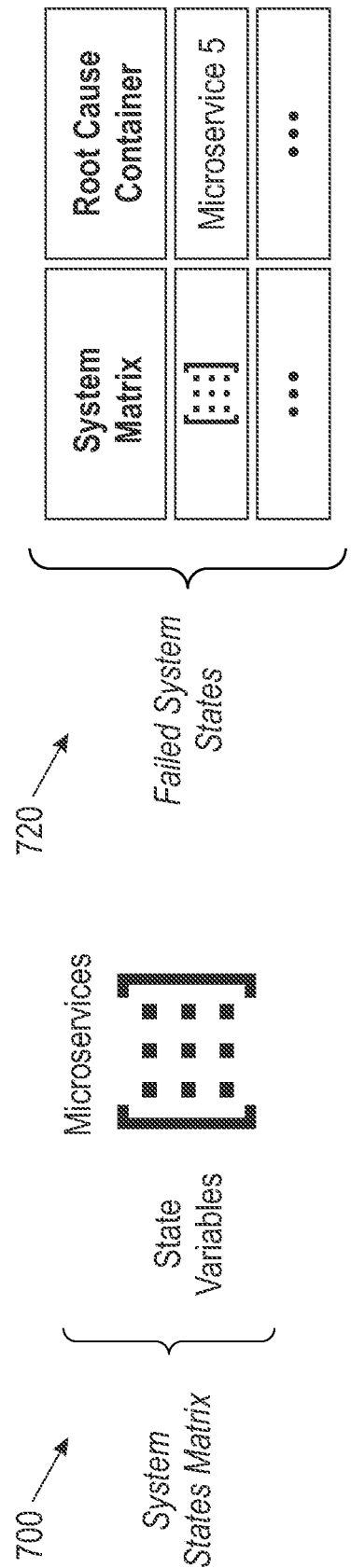

IDENTIFICATION AND/OR PREDICTION OF FAILURES IN A MICROSERVICE ARCHITECTURE FOR ENABLING AUTOMATICALLY-REPAIRING SOLUTIONS

BACKGROUND

The present invention relates to microservices, and more specifically, this invention relates to identification and/or prediction of failures in microservices, including those of cloud storage systems and networks.

A microservice architecture is an architecture that includes a plurality of microservices. The microservices are generally single function modules that communicate and work with each other to perform some greater function. This architecture is becoming more popular because of the advantages it offers such as the option to quickly update code, to easily scale microservices, and to enable independent development.

SUMMARY

A computer-implemented method according to one embodiment includes causing a failure event in each of a plurality of microservices of a system and collecting failure effect data associated with the caused failure events. A mapping is created detailing transition of the microservices between different states and the collected failure effect data is analyzed for creating the mapping. The method further includes outputting a predetermined notification in response to a determination that a first of the microservices is close to experiencing a predicted failure event, and outputting a suggested solution for repairing the system in response to a determination that the system has failed, using the mapping to identify a root cause of the system failure. Using the mapping to identify the root cause of the system failure includes identifying the microservices that caused the system failure.

A computer program product according to one embodiment includes a computer readable storage medium having program instructions embodied therewith. The program instructions are readable and/or executable by a computer to cause the computer to perform the foregoing method.

A system according to one embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7A is a matrix of microservice states, in accordance with one embodiment.

FIG. 7B is a table including failure effect data, in accordance with one embodiment.

DETAILED DESCRIPTION

Figure 1:
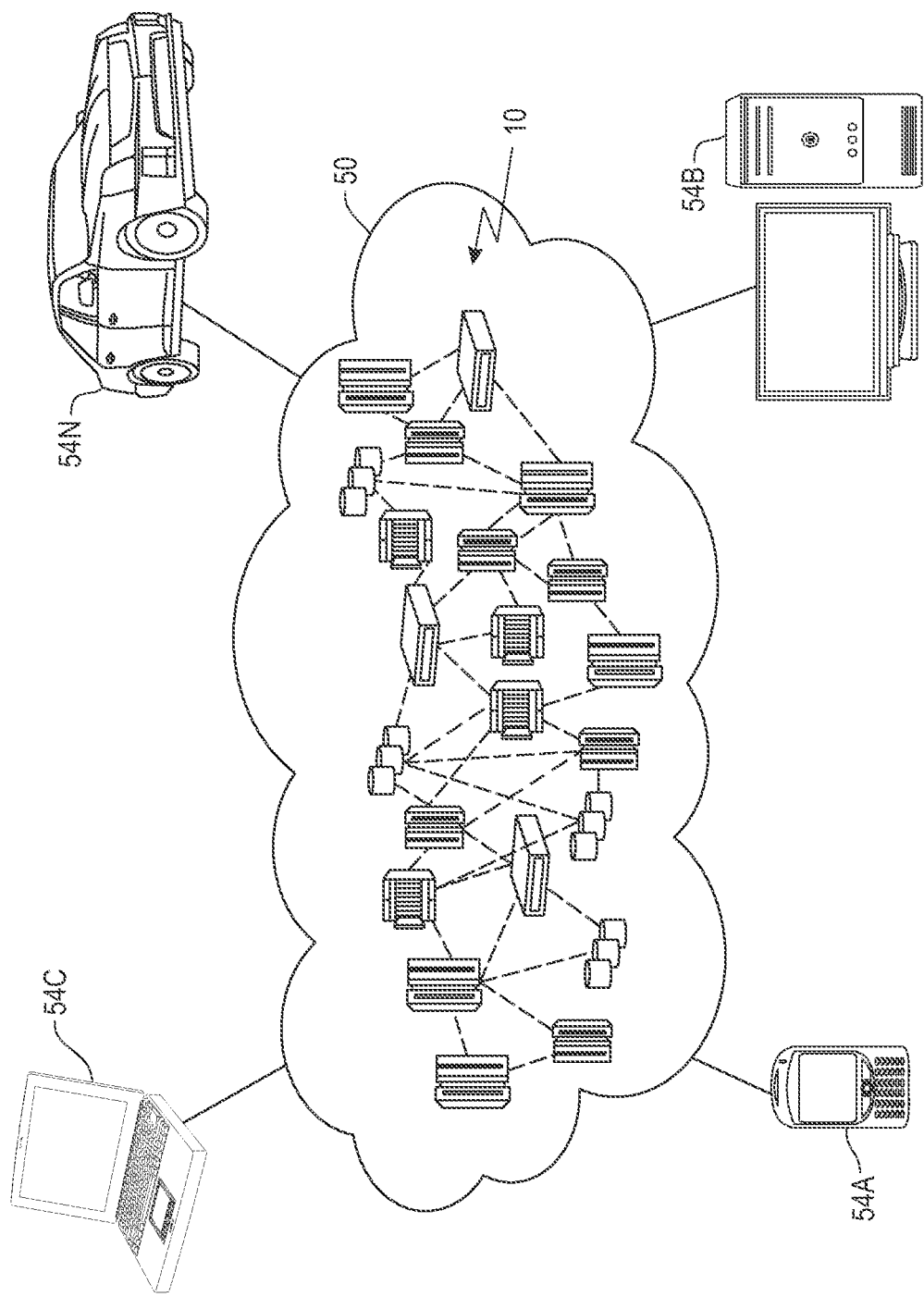
FIG. 1 depicts a cloud computing environment, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of systems, methods and computer program products for identification and/or prediction of failures in a microservice architecture, and in some approaches remediating such failures.

In one general embodiment, a computer-implemented method includes causing a failure event in each of a plurality of microservices of a system and collecting failure effect data associated with the caused failure events. A mapping is created detailing transition of the microservices between different states and the collected failure effect data is analyzed for creating the mapping. The method further includes outputting a predetermined notification in response to a determination that a first of the microservices is close to experiencing a predicted failure event, and outputting a suggested solution for repairing the system in response to a determination that the system has failed, using the mapping to identify a root cause of the system failure. Using the mapping to identify the root cause of the system failure includes identifying the microservices that caused the system failure.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
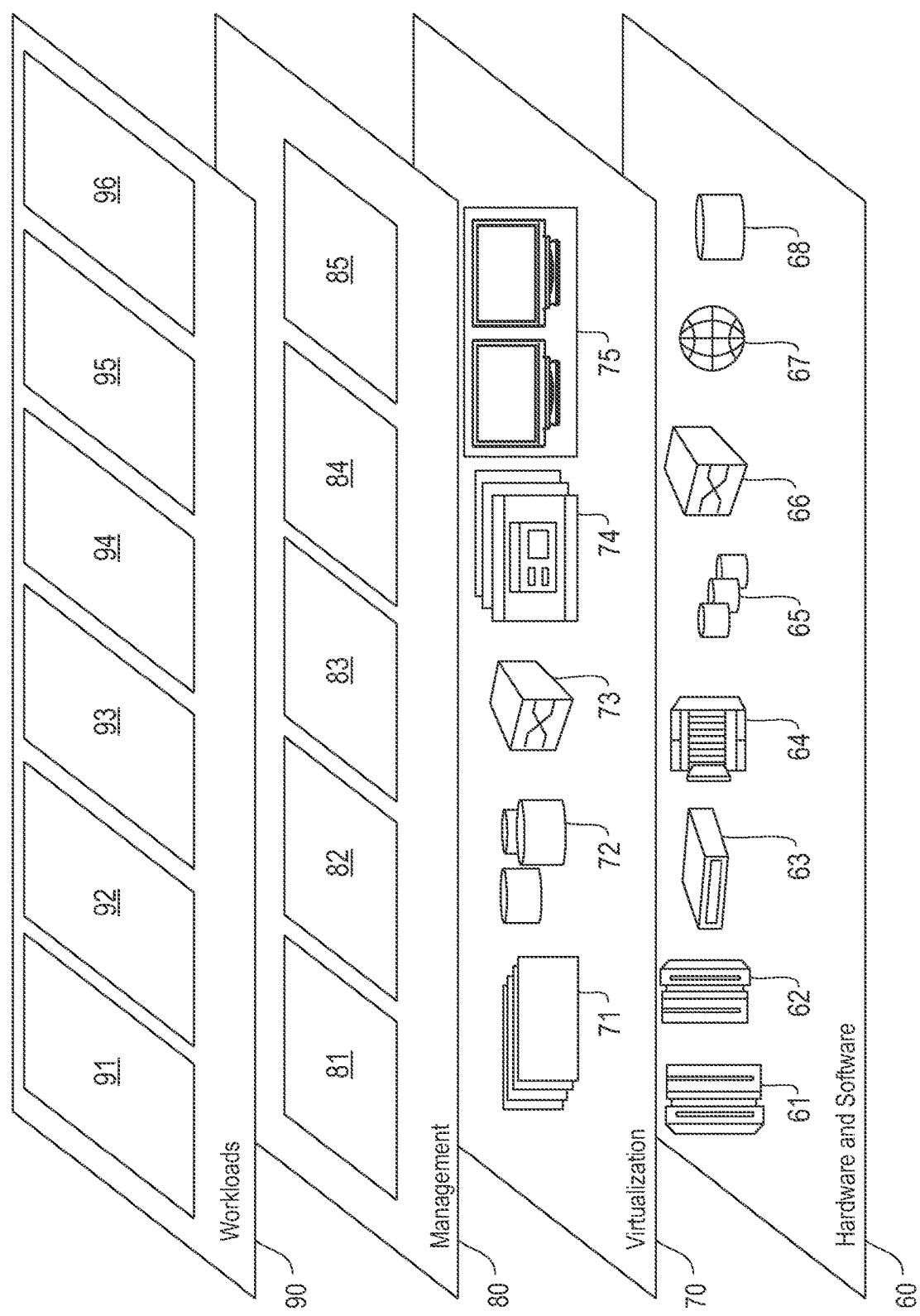
FIG. 2 depicts abstraction model layers, in accordance with one embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice architecture processing 96.

Figure 3:
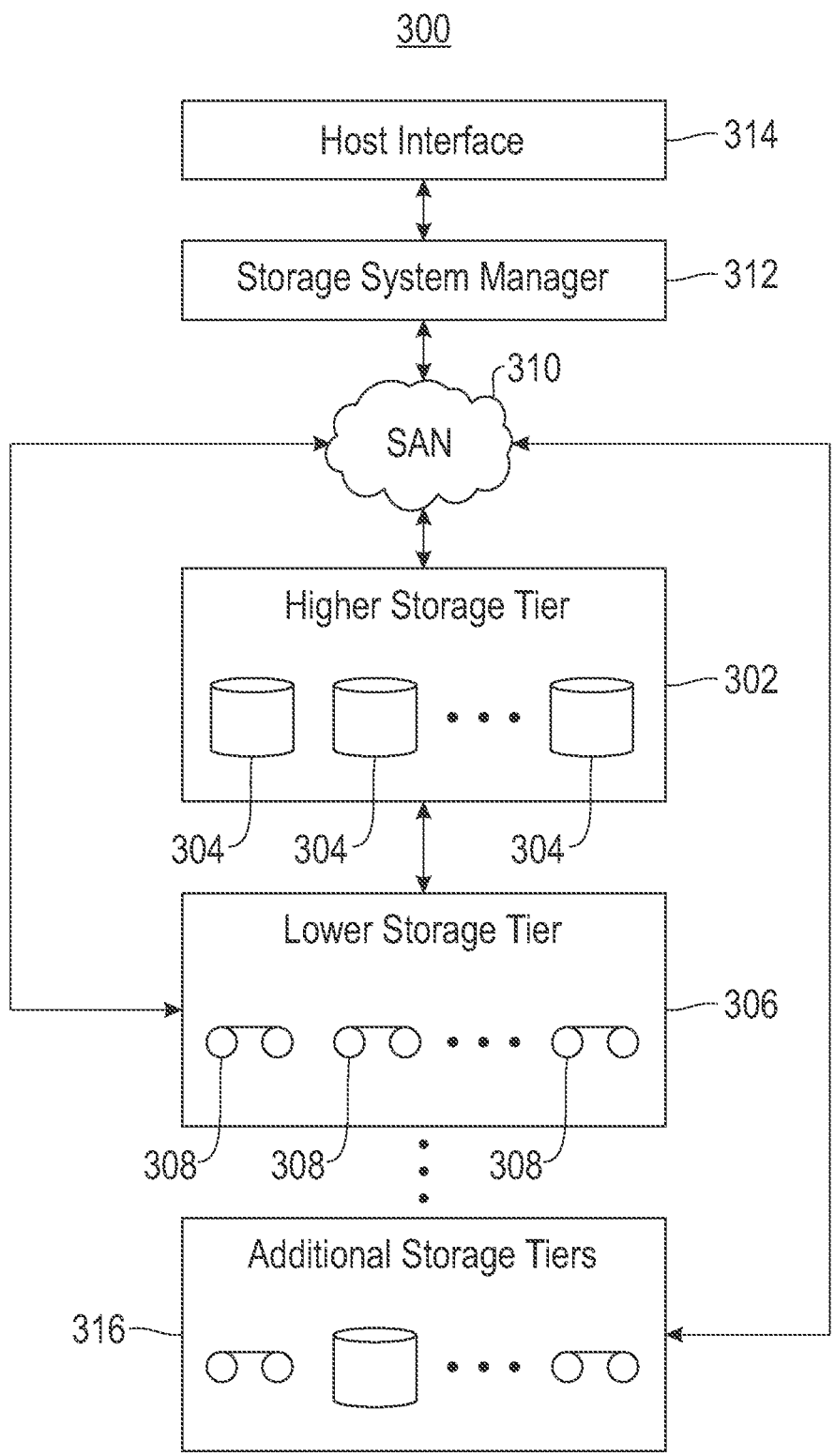
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned above, a microservice architecture is an architecture that includes a plurality of microservices. The microservices are generally single function modules that communicate and work with each other to perform some greater function. This architecture is becoming more popular because of the advantages it offers such as the option to quickly update code, to easily scale microservices, and to enable independent development.

In some microservice architectures, various types of failure events may be experienced by one or more of the microservices that make up the architecture. These failure events may result in a compromised application interface and/or experience for users, and therefore developers that manage the applications are typically responsible for debugging individual microservices of the applications in order to restore the compromised application. Because some microservice architectures rely on a large number of microservices to build a single system, often managed by a plurality of independent developers, the process of realizing when and why any microservice of the system fails can be a relatively involved one. For instance, when a transaction (or application programming interface call) fails, in some protocols the transaction is retried until success is achieved. Because of this, an end user may never be notified that as to why an operation is not working as intended. To know when something went wrong, the developer typically has to wait until a problem is seen by someone, e.g., such as a user or another developer or system administrator. This results in disappointed customers and prolonged system downtime.

According to an illustrative example, a failure event may occur in a system that serves as a storage provider. In such an example, the failure event may include the storage provider running out of storage capacity as data is written by a microservice that is responsible for writing data to a storage medium. Upon occurrence of the failure event, any other microservice that is in communication with the storage based microservice may also experience a failure event. In another approach, a system may experience a failure event in the form of a performance degradation in an application. According to a more specific example, fulfillment of a user request taking an abnormal amount of time may be due to decreased performance of an application. In some approaches this may be the product of a recent change in code, a bug being present in the code, the system not being properly scaled out for the current number of active users, etc.

The failure events described above may result in a compromised application interface and/or experience for users, and therefore developers that manage the applications are typically responsible for debugging the microservices of the applications in order to restore the compromised application. However, as indicated above, because microservice architectures rely on an interconnectivity of microservices that are typically managed by different developers, the process of tracking down error event locations is often complicated and resource intensive.

Figure 4:
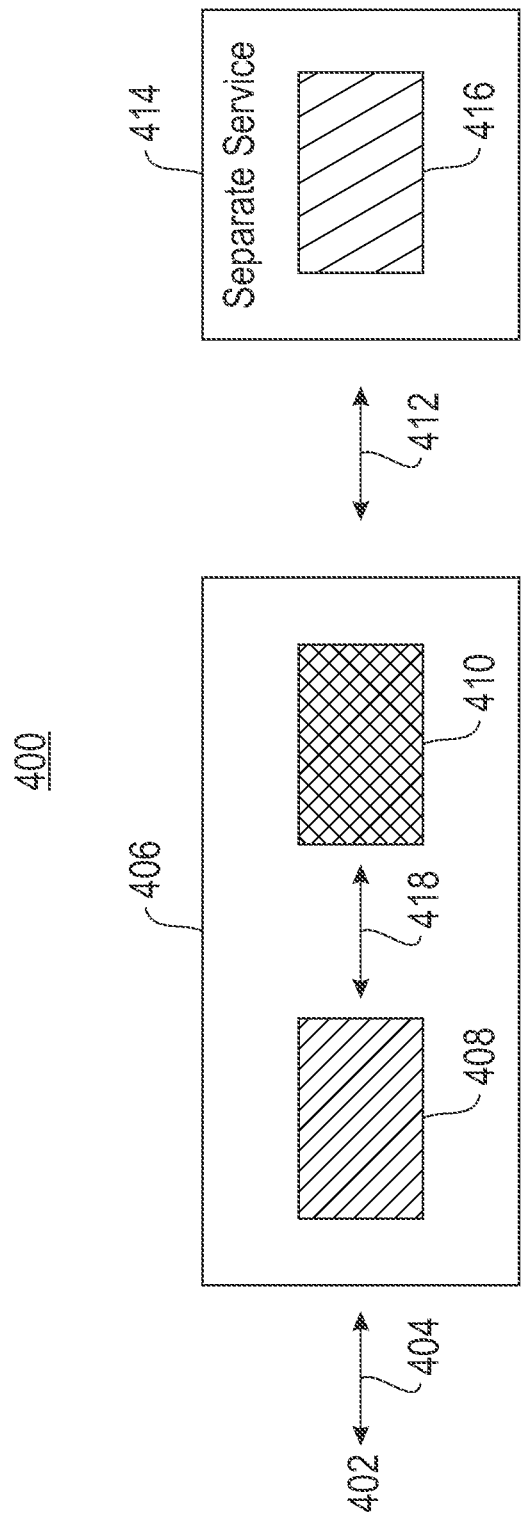
FIG. 4 is a diagram of a microservice architecture, in accordance with one embodiment.

A microservice architecture 400 is represented in FIG. 4 for purposes of a non-limiting example. In the current example, the microservice architecture 400 includes a known type of development environment 406. The development environment 406 includes a first microservice 408, e.g., a controller, and a second microservice 410, e.g., a transaction manager. For context, in the current example it may be assumed that the first microservice 408 is managed by a first developer and the second microservice 410 is managed by a second developer. The development environment 406 may be in communication with at least a first user computer 402, e.g., see communication 404. Additionally, the development environment 406 may be in communication with a separate service 416 of a known type, e.g., such as a web service, of a second environment 414, e.g., see communication 412. In one approach the first microservice 408 may be in communication with the second microservice 410, e.g., see communication 418.

While managing the current illustrative microservice architecture 400, developers of an application thereof may receive complaints from the first user regarding error events experienced by the first user computer 402 at the application level of the microservice architecture 400. For example, in one approach the first developer and/or the second developer may receive a message from the first user describing an undesired behavior experienced while using an application hosted by the development environment 406. In response to receiving the message from the first user, the first developer and/or the second developer may perform diagnostic measures for tracking down microservice components that caused the error, e.g., performing debugging computer code of the first microservice 408 and/or computer code of the second microservice 410. However, as will now be described below, based on the interconnectivity of microservices within the microservice architecture 400, there are several issues that conventionally complicate identification of errors in microservice environments. One issue is knowing which microservice to first investigate, which could require knowledge of all microservices in the system. It is however unlikely that a given developer would have such an extent of knowledge because one of the advantages of microservices is that developers may only need to manage information of a unique one of the microservices. Additionally, because some microservices are built to serve only a small function, the communication necessary to link all the microservices together to build a system can be extensive.

In the current example it may be assumed that each developer only has domain knowledge about a specific component of the microservice architecture 400. For example, the first developer may notice a characteristic of the error in the form of a packet not being delivered to the first user computer 402. Based on this detection and/or based on the complaint received from the first user, the first developer may search for a cause of the failed packet delivery. However, in one approach the first developer may not have access to domain knowledge revealing the error as a result of such information being only accessible by another of the developers, e.g., such as the second developer. For example, the first developer may find no errors in log messages of the first microservice, but in attempting to determine the cause of the error may perform debugging on the second microservice 410 and inaccurately conclude that the second microservice 410 is the root cause of the error based on detecting an error in the log messages of the second microservice 410. The first developer performing these debugging efforts are however inefficient and ultimately a waste of processing resources because, in the current example, the separate service 416 of the second environment 414 is actually the root cause of the problem, which in failing caused the transaction manager of the second microservice to fail. Note that failure of the second microservice may be based on the second microservice being in communication 412 with the separate service 416. Accordingly, unknown to the first developer, there is nothing in fact wrong with the transaction manager, despite the transaction manager appearing, in the perspective of the first developer, to be a potential cause of the problem.

In sharp contrast to the inefficient and resource intensive conventional manual debugging techniques described above for performing microservice failure analysis, various embodiments and approaches described herein enable identification of a microservice failure as well as the root cause of error events occurring on the microservice. Suggested solutions are offered to developers of the microservice for enabling relatively quick mitigation of the error event. Furthermore, various embodiments and approaches described herein predict occurrence of failure events of a microservice, which in turn can be provided to developers managing a microservice environment. This allows such developers to take corrective actions, e.g., such as code modification, for preventing the failure event from occurring.

Figure 5:
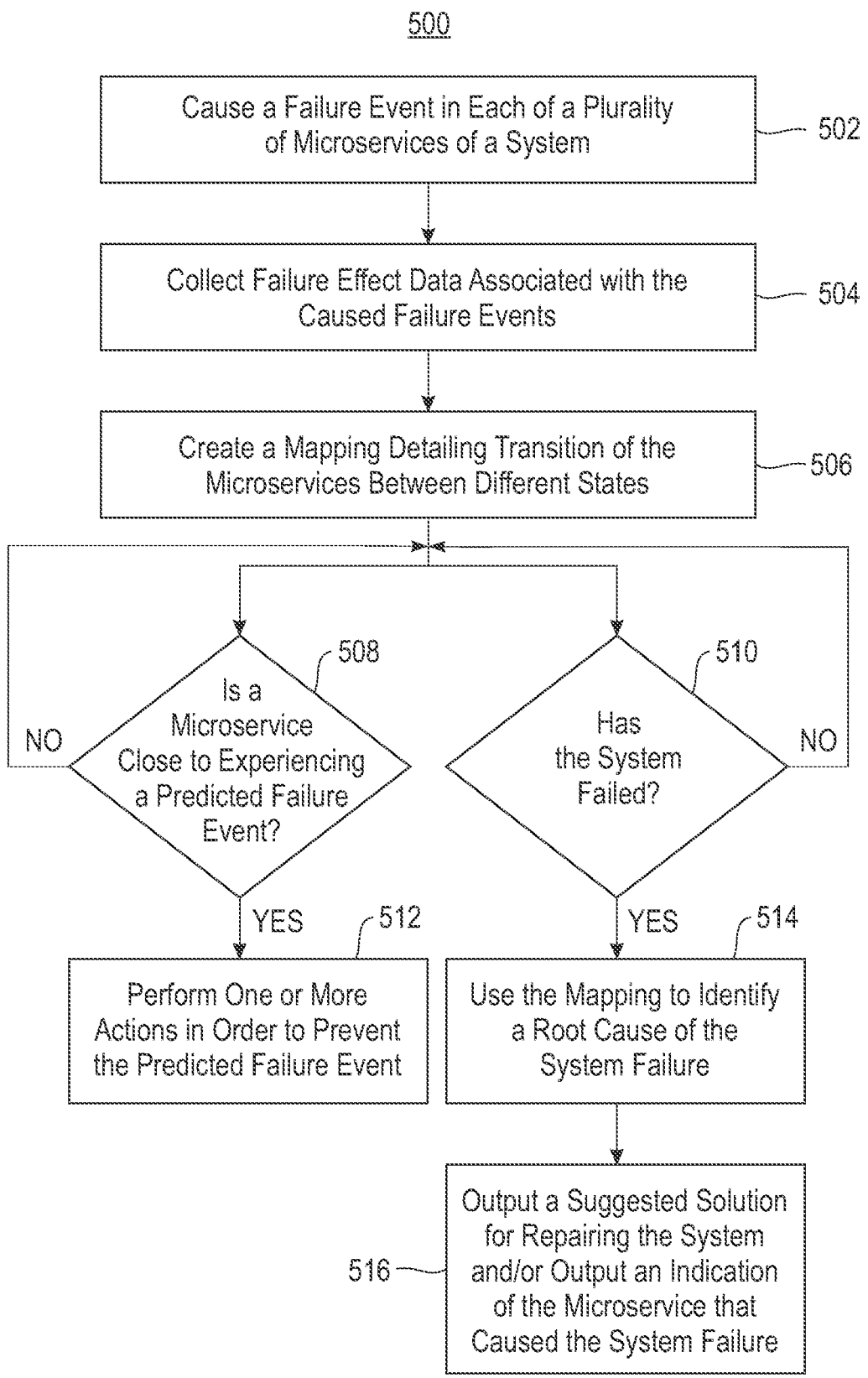
FIG. 5 is a flowchart of a method, in accordance with one embodiment.

Now referring to FIG. 5, a flowchart of a method 500 is shown according to one embodiment. The method 500 may be performed in accordance with the present invention in any of the environments depicted in FIGS. 1-4 and 6-7B among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 500 includes techniques for aggregating information about states of microservices of a system and actions that each of the microservices can take. As will be described below, the aggregated information may thereafter be used in order to notify a developer when an application is close to failure, as well as determine exactly which microservice has caused a system to fail, even when multiple microservices fail at the same time. The information may furthermore be utilized to suggest solutions to repair failed microservices, the process of which includes first automatically identifying when a microservice has failed and thereafter offering suggestions of how that user can repair the microservice.

For context, the microservice system may include any known type of microservice architecture, which may differ depending on the approach. In some approaches, one or more of the microservices may be in communication with one or more separate services. For example, in one approach a first of the microservices of the system may be in communication with a web service that a different company is hosting. In such an approach a transaction manager of the first microservice may communicate with the web service through application programming interfaces. Note that depending on the approach, some applications may not include such an interface feature. Moreover, in some approaches one or more microservices of a microservice architecture may be located on different environments, e.g., such as a KUBERNETES environment, and multiple microservices many make up one application. In another approach, one microservice may make up one application. In one KUBERNETES environment there may be multiple applications. The microservice environment may additionally and/or alternatively be part of a cloud storage system and network, e.g., see FIG. 1.

In some approaches, in order to generate information about microservices of a system and actions that each of the microservices can take, a failure event may be caused in each of a plurality of microservices of a system, e.g., see operation 502 of method 500. According to one preferred approach, the failure events may be caused during development and testing of the microservice architecture. As will be described below, the microservices are failed in order to understand what effect the failure in one microservice has on other microservices.

Failure events may be initiated and performed using any one or more techniques for causing failure events in microservices that would become apparent to one skilled in the art upon reading the present disclosure. For example, known techniques for causing failure events in microservices may be used. According to another approach, a microservice may be failed by scaling down a container orchestration framework deployment, e.g., such as KUBERNETES, to zero replicas. Additional techniques for failing a microservice may include, e.g., modifying microservice's functions to return an error rather than the correct response, inserting a 'sleep' command of a known type to mimic a performance degradation in the microservice, etc.

Failure effect data associated with the caused failure events is in some approaches collected, e.g., see operation 504 of method 500. The collected failure effect data may include any one or more known types of metrics that are associated with the caused failure events. In one preferred approach, the collected failure effect data indicates the states of each of the microservices after each of the caused failure events, ideally including states of all of the microservices recorded after each individual failure event. The collected failure effect data may in some approaches additionally and/or alternatively include, e.g., information detailing which microservices of the system are running, information detailing which microservices are not running, information detailing when each microservice function is called and for how long the function runs, information detailing CPU utilization, information detailing memory utilization, information detailing network throughput, information detailing log data from at least one of the microservices, information detailing a number of threads that are running, etc. Moreover, depending on the approach, the collected failure effect data may detail information about the microservices at any time, e.g., prior to a caused failure event, during the microservice(s) failing, after the microservice(s) have failed, after at least one of the microservices has been repaired, etc.

The failure effect data may additionally and/or alternatively indicate actions of the microservices, e.g., potential actions that one or more of the microservices may take, actions that the microservices previously took, actions that caused a microservice to fail, functions called by a microservice, actions that a microservice took in response to the failure event, etc. For context, in some approaches, actions define how microservices move between states. A non-limiting list of information associated with actions that microservices may take include, e.g., microservice functions called and parameters associated therewith, functions that microservices are calling on themselves, the origin of a called function, a scaling up (based on a determination that a current load on a microservice is to large) or down of microservices, CPU changes, memory changes, network changes, network bandwidth changes, etc. In some approaches failure effect data that includes action based information may be determined through known observation techniques. For example, in one approach, failure effect data may indicate that a microservice failed in a second state after being in a first state. In such an approach, the failure effect data may include information detailing probabilities of actions of a microservice from the first state to the second state. In some approaches the probabilities may be determined using known observation techniques. In another approach, the probability of a microservice transitioning from a current state to a subsequent state after taking a given action may be determined using the following equation:

$$p(s', a', s) = n(s', a', s)/n(a', s) \qquad \text{Equation (1)}$$

For context, in equation (1), p(s', a', s) represents the probability "p" that a microservice will transition from a current state "s" to a second state "s'" after taking action "a'." Moreover, "n(s', a', s)" is the number of times action "a'" taken from state "s" led to state "s'," and "n(a', s)" is the number of times action "a'" was taken from state "s."

In some approaches the failure effect data may be collected using a metric monitoring and/or an exporting service. Collection in such an approach may be at least in part performed by instrumenting microservice code that is configured to collect predetermined types of failure effect data.

For example, according to a more specific approach, the failure effect data may be collected using a known data collection platform, e.g., such as PROMETHEUS, and/or KUBERNETES. In such an approach, a script may be written that parses all of the microservice code and inserts PROMETHEUS instrumentation at the beginning and end of every function that records timestamp information when a predetermined point, e.g., such as a change in state, is reached. As a result, the failure effect data includes information detailing when each microservice function is called and for how long that function runs. Information such as, e.g., CPU utilization, memory utilization, network throughput, what microservices are running, different functions called within the microservices, log data, information about a current number of running threads, etc., may additionally and/or alternatively be collected and stored as the failure effect data. Moreover, in a preferred approach, log data from all the microservices of the system may be collected using a known type of "log" command, e.g., such as using a KUBERNETES log command, which may be executed in the microservice code.

Operation 506 of method 500 includes creating a mapping detailing transition of the microservices between different states, e.g., such as states of the microservices before the caused failure events and states of the microservices immediately after the caused failure events. States may in some approaches be recorded after each failure event is caused. In contrast, in another approach, the states of the microservices may be recorded after all of the failure events have been caused, e.g., once all of the microservices of the system have reached a failed state. In yet another approach, states may be recorded after a predefined group of failure events have been caused, e.g., such as on a predefined group of the microservices.

In some approaches, microservice information may be clustered within the mapping according to states of associated microservices. For context and as will be described in further detail elsewhere below, the mapping may be used for potentially identifying root cause of a failed microservice, identifying failed microservices in a failed system of microservices, microservices predicted to fail, and solutions for resuming and/or avoiding a failure event of a microservice, etc., based on comparing a current state of the microservice system with recorded failure states of the microservice system.

According to one approach, creating the mapping may include adding information, e.g., information detailing the different states of the microservices, information detailing actions of the microservices, state probability information, etc., into one or more matrices. The state of a microservice may be defined by one or more variables, e.g., such as the percentage of CPU utilization, percentage of memory utilization, network throughput, running function, time for functions to complete, values of variables in functions, number of currently running threads, number of each type of errors or exceptions, number of each type of log message, number of instances of the microservice, which is preferably collected in the failure effect data.

Creating the mapping may additionally and/or alternatively include executing a predetermined reinforcement learning algorithm of a known type. The predetermined reinforcement learning algorithm may analyze the collected failure effect data for creating the mapping showing how microservices move between the states. For example, in one approach the mapping may illustrate how microservices move between a "safe state," e.g., a state in which the microservice is determined to have a low relative probability of failing, a "dangerous state," e.g., a state in which the microservice is predicted to fail, and a "failed state," e.g., a state in which the microservice is determined to have failed, etc. Method 500 may additionally and/or alternatively include using known techniques for monitoring tests performed by developers on the microservices. States of the microservices observed during such testing may be labeled as "safe" or "failed" depending on the success of the test. Moreover, in one approach, states of a microservice that occurred within a predetermined range of time "t" before occurrence of a failed state may be marked as being a "dangerous" state within the mapping.

According to various approaches, method 500 may include monitoring for failure of the system of microservices, e.g., see decision 510, which may be caused by one or more of the microservices experiencing a failure event. Yet furthermore, in some approaches method 500 may additionally and/or alternatively include continuously, periodically, and/or in response to an event, determining whether one or more of the microservices is close to experiencing a predicted failure event, e.g., see decision 508. With continued reference to the flowchart of FIG. 5, such monitoring may be performed using known monitoring techniques. In some approaches, in response to a determination that the system of microservices has not failed, e.g., see "NO" logical path of decision 510, monitoring for failure of the system may continue. Similarly, in response to a determination that one or more of the microservices are not close to experiencing a predicted failure event, e.g., see "NO" logical path of decision 508, monitoring for predicted failure events may continue. Various techniques for monitoring for and determining the cause of failure events, predicting failure events, as well as solutions for recovering a microservice system to a safe functional state will now be described below.

A determination that a microservice is close to experiencing a predicted failure event may be based on the collected failure effect data. In one preferred approach, the determination that a microservice is close to experiencing a predicted failure event includes comparing a current state of the microservice to potential actions of the microservice capable of causing the microservice to change to a different state, e.g., from a current state to a new state. For context, the term "capable" may, depending on the approach, be defined as previously determined to cause, known to cause, etc. In another approach, "capable" may be defined according to previous observation, e.g., assuming a microservice to be in a given state, previous actions taken from that state have been observed to lead to a new state. In such an approach, the microservice is capable of transitioning to that new state, if the action has been observed during testing. In some approaches, a determination that a microservice is close to experiencing a predicted failure event, e.g., see "YES" logical path of decision 508, may be made in response to one or more of the potential actions of the microservice exceeding a predetermined threshold of probability of causing the microservice to enter a failed state. For example, for a storage based microservice that is already using a majority portion of processing resources for queued write operations, an action of fulfilling 1100 received write requests may be determined to have a relatively high probability of causing a failure event, e.g., based on the relatively high probability of the microservice exceeding write capabilities. It should be noted that such a determination may be based on microservice failures observed during the caused failure events, and therefore in some preferred approaches, the determination may in some approaches be based on a current state of a microservice and/or potential actions of the microservice resembling, e.g., within a predetermined degree of similarity, the states and/or actions of a microservice that previously failed after being subjected to one or more conditions of the caused failure events. The state information of the failure effect data may in some approaches contain all of the related failure information. Accordingly, when the combination of this information indicates a failure, e.g., based on similarity to known failure states which may be determined from information obtained during operations 502-504, all information related to failures is being considered, e.g., log/error messages, performance, CPU, memory utilization, etc.

In response to the determination that a microservice is close to experiencing the predicted failure event, e.g., see "YES" logical path of decision 508, one or more actions may be performed in order to prevent the predicted failure event, e.g., see operation 512. For example, in one approach, an action performed in order to prevent the predicted failure event from occurring on the microservice includes instructing a forced micro-reset of the microservice that is predicted to fail. In such an approach, the micro-reset is preferably faster than the natural restart that happens when a microservice fails. Moreover, in addition to micro-resets, the microservice system may log failure avoidances and their success rates. This information may be used, e.g., by a developer, to fix the problems within the microservice's source code that caused the microservice to enter a state that is predicted to fail.

In another approach, an action performed in order to prevent the predicted failure event from occurring on the microservice includes outputting a predetermined notification. For example, the notification may include a warning notice which may be output to a developer of the microservice. The warning notice may provide the developer with ample time to take actions, e.g., increasing processing resources, queuing debugging operations, amending computer code, scaling out one or more of the microservices, restarting one or more of the microservices, etc., for preventing the predicted failure event from occurring. This warning is important for avoiding failure events because without it, the microservice system may otherwise reach a state in which a next set of potential actions are capable of causing a failure state, e.g., capable with a 90% certainty.

In response to a determination that the microservice system has failed, e.g., see "YES" logical path of decision 510, method 500 may include using the mapping to identify a root cause of the system failure, e.g., see operation 514 of method 500. The system failure may result from an error event occurring in at least one of the microservices. According to one preferred approach, use of the mapping to identify the root cause of the system failure may include identifying the microservices that caused the system failure. In some approaches matrices comparisons may be performed in order to identify the microservices that caused the system failure. For example, in order to determine a system state, information of at least one of the microservices may be added to a matrix and compared to another matrix containing failure effect data. Note that in some approaches, the matrix may additionally and/or alternatively be used to determine when a system is close to failure. During the caused failure events, the state of all microservices of the system may be saved by creating a single matrix, e.g., a system state matrix, that incorporates state variables and associated values for every microservice. Continuous variables may in some approaches be made categorical to reduce the state space, thereby allowing for a more robust failure prediction algorithm. For instance, CPU usage may be defined as relatively low, e.g., 0%-33%, relatively medium, e.g., 33%-66%, relatively high, e.g., 66%-100%, etc. Additionally, to reduce space consumed by these variables, a frequency with which these variables are collected may be decreased. The single matrix may be tagged with a microservice (or microservices) identified to have failed during the caused failure events, e.g., microservice F, to indicate that the microservice is the root cause of the system failure resulting from the caused failure events. A state for a microservice may be represented as a vector with entries corresponding to the state variables described elsewhere herein, and the value of the state variable. The single matrix and the system state vectors may be stored in a data structure, e.g., such as a single matrix is the system state matrix which is comprised of all of the vectors for each microservice. This matrix may be labeled "Failed_States" in one illustrative approach. Thereafter, in response to a determination that a failure has occurred in the production environment, e.g., the microservice system has failed, information detailing the state of all microservices may be collected and input into a second system state matrix. The second system state matrix may then be compared with all collected system state matrices, e.g., see operation 504, in order to determine exactly which of the microservices caused the system failure, even if multiple microservices fail at the same time. In one approach, this may be performed by determining a cosine similarity between the second matrix and all of the system state matrices in Failed_States. In such an approach, the system state matrix in Failed_States having the highest similarity score, e.g., such as above a predetermined threshold, may be selected, and a microservice failure corresponding to the selected system state matrix may be determined to be a root cause of failure. For example, in continuance of the example described elsewhere herein including "safe," "dangerous" and "failed" state determinations, each state of a given microservice of the failed system may be compared to the "safe" states for that microservice using a cosine similarity score. If the state is significantly different, e.g., greater than 40% different, greater than 75% different, greater than 95% different, a predetermined amount of difference, etc., from any "safe" state, the state of the microservice will be determined to be "failed," and may be marked accordingly in the mapping and/or determined to be a cause of the system failure. This ensures that microservices and/or components thereof that were working properly at the moment of the system failure are still be considered to have been in a "safe" state in the root cause determination. According to another example, in response to a determination that a state of at least one of the microservices after a caused failure event matches a state of a second of the microservices after the system failure, the second microservice may be determined to be a cause of the system failure.

It should be noted that the comparisons described above may implement any known matrix comparison techniques. A non-limiting collection of techniques that may be applied in the comparisons include, e.g., Fast and Automatic Clustering Approach to Data Engineering (FACADE), hierarchical clustering, Norm (difference between matrices), etc.

Operation 516 of method 500 includes outputting a suggested solution for repairing the system. In one approach the suggested solution may include a summary of the determined root cause of the system failure, and identify known and/or predicted solutions for fixing the microservices determined to have caused system failure. However, in some other approaches, although a microservice that caused the system failure may be identified, at least initially, a suggested solution for repairing the solution may be unknown. In such an approach, an indication of the microservice that caused the system failure may be output, e.g., see operation 516.

In some approaches, operation 516 and/or operation 512 of method 500 may utilize feedback information that is ongoingly aggregated into a table that suggested solutions are based on. For example, in one approach, in response to identifying avoidance of a failure event by one of the microservices, information detailing the failure event avoidance may be logged into a table. The information may include, e.g., events that occurred, states of the microservices before and after the failure avoidance, solutions and/or actions taken that resulted in the failure avoidance, etc. Success rates of the failure event avoidance, e.g., such as based on an ongoingly updated tiered prioritization, may additionally and/or alternatively be incorporated into the table and thereafter used to mitigate source code problems of one or more microservices that would otherwise result in a system failure.

The features of various embodiments and approaches described herein are not offered in conventional microservice environments, as developers of conventional microservice environments often do not notice failure events until a user of the developer's application attempts to use the application and something does not work as expected. As described in detail in such embodiments and approaches, using one or more techniques described herein, a programmatic determination may be performed to identify when a microservice has failed, to allow for remedying issues within code of a microservice before a user experiences an associated issue at an application level. Additionally, analysis of complex dependencies within microservice code is eliminated as a result of using one or more techniques described herein for programmatic determination of a root cause of a microservice system failure. Yet furthermore, one or more techniques described herein enable prediction of a microservice failure in order to enable warning of the predicted failure and/or in order to enable recommendations of remedial measures for a developer to execute. With this, user applications entirely avoid ever reaching a failed state. Instead, in some approaches the application administrator and/or developer may be notified once the administrator's application reaches a dangerous state. The application administrator and/or developer may thereafter take one or more recommend actions for preventing a failed state from occurring. For example, a microservice that has entered a "dangerous" state may be reset. This as a result prevents system downtime that would otherwise occur within a microservice environment if such a failed state occurs. However, in the event that the microservice system does experience a failed state, remediation is still available for relatively quickly repairing the failed system. For example, a failed state resulting from 100% CPU utilization may be remedied by scaling out the microservice that caused the system failure and/or increasing the CPU of the microservice. Another remedy may include splitting a workload across multiple microservices. Moreover, actions that are determined to lead to a failed state may thereafter be restricted, e.g., users at an application level may be thereafter restricted from repeating the failure causing combination of actions.

Additional benefits that result from utilizing one or more of the embodiments and approaches described above include enablement of tracking down computer code bugs relatively quicker than conventional microservice management techniques, and a more accurate monitoring of a microservice production system. Accordingly, improved efficiency of microservice management by developers is enabled which will likely prove important as the overall complexity of microservice architectures increase.

Figure 6:
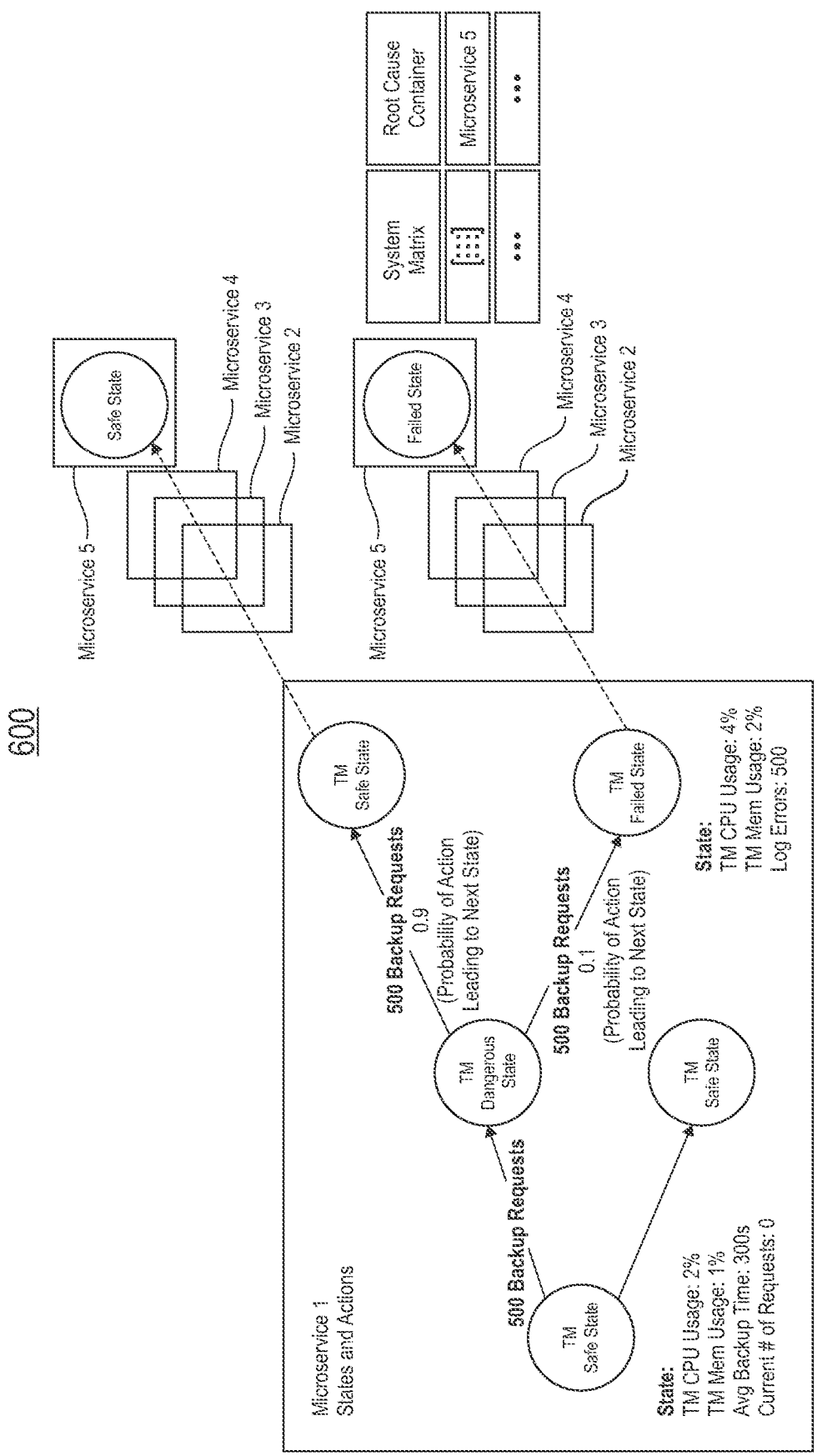
FIG. 6 is a mapping representing the transition of a microservice between states and actions taken by the microservice to transition between the states, in accordance with one embodiment.

FIG. 6 depicts a mapping 600 that represents transition of a microservice between states and actions taken by the microservice to transition between the states, in accordance with one embodiment. As an option, the present mapping 600 may be implemented in conjunction with features from any other embodiment listed herein, such as those described with reference to the other Figs. Of course, however, such mapping 600 and others presented herein may be used in various applications and/or in permutations which may or may not be specifically described in the illustrative embodiments listed herein. Further, the mapping 600 presented herein may be used in any desired environment.

The mapping 600 may be used to track and/or understand how microservices move between states, e.g., see Microservice 1, Microservice 2, Microservice 3, Microservice 4, and Microservice 5. In order to establish the mapping 600, actions occurring in an associated microservice system may be monitored. Examples of such actions are microservice functions called, along with the parameters they are called with, and the scaling of microservices (up or down). Actions are batched together over a time period. This allows the action "1000 of requests X" to be differentiated from "1 request X." For context, "request" may be a generic term used to describe a higher level action the microservice completes. These will vary across different microservice applications but can be determined from a function, or series of functions, and the function parameter values. Actions are also clustered, using techniques such as K-means clustering, in order to optionally not differentiate between "999 of request Y" and "998 of request Y" since both actions may likely have similar effects on the state of the microservices.

In one approach, the mapping 600 considers log errors. For example, the mapping 600 includes 500 different log messages, e.g., see 500 backup requests, for Microservice 1. A normally functioning microservice system typically include no log errors, and therefore in some approaches, a determination that a microservice system has failed may be based on a microservice having a predetermined number of log errors, e.g., at least one log error, 500 log errors 1000 log errors, etc. In order to cluster microservices of the mapping 600 according to states, microservices determined to have similar failure parameters may be determined to be failed states, e.g., see TM failed state, and clustered together. For example, microservices determined to have a number of log errors within a predetermined range, e.g., within one hundred log errors, within fifty log errors, within ten log errors, etc., from a number of log errors of a failed microservice, e.g., 500 in the example above, may be clustered as being in a dangerous or failed state.

In some approaches, a reinforcement learning algorithm may be applied in a microservice system associated with mapping 600 in order to create and/or update the mapping 600 using characterized states of microservices, e.g., states as nodes and actions as edges. Mapping 600 may be created during testing while metrics are constantly being recorded and actions taken during testing may be selected by the reinforcement learning algorithm in order to explore all possible state and action spaces. Data of the metrics are preferably used to determine a current state of each microservice and the actions taken in the system. In some approaches, a mapping may be created for each microservice of the system, and the states of the microservices across different mappings may be correlated by time. In a preferred approach, different states may be characterized as "safe" where a microservice is functioning correctly, "dangerous" where a microservice is still functioning but predicted that performance may begin degrading, or "failed" when a component of a microservice is functionally not working. For context, an overall goal of applying the algorithm may be to categorize "failed" states with failure effect data which thereafter may be used in a production environment to identify microservices that are subject to failing or have failed. Moreover, in some approaches, in order to categorize states, actions may additionally be categorized based on the actions providing context of a trajectory that a given application is taking.

The mapping 600 additionally includes probabilities of a state of a microservice entering a different state, e.g., see edges of the mapping 600. Probabilities may detail the different states that taking different actions may lead to. For example, taking a first action from a current state may lead to a second state in some situations but a third state in other situations. In some approaches such probabilities may be determined by examining test behavior, e.g., see Equation (1). As illustrated in mapping 600, TM dangerous state is depicted to have a 90% probability, e.g., see 0.9, of entering state TM safe state, and a 10% probability, e.g., see 0.1, of entering state TM failed state. In one approach the probabilities may be calculated using the techniques described elsewhere herein, e.g., see Equation (1). Information incorporated into the probabilities may additionally and/or alternatively be calculated by observing an online system and/or a testing system. For example, existing developer tests may be run, and while applications of the system are monitored during the test being run, information about the states and the actions of the microservices of the system may be collected and recorded. Outcomes of the test, e.g., passing or failing, may also be determined based on observation performed during the tests. States of microservices associated with a passing test are preferably labeled as "safe" states within the mapping 600, while in contrast, states of microservices associated with a failing test are preferably labeled as "failed" states within the mapping 600, e.g., see microservice 5 of Failed System States. In some approaches, in response to a determination that a current state of a microservice matches one or more states previously associated with a failed system, the current state may also be considered to be "dangerous" or "failed" states within the mapping 600. In some approaches, "matching" may be defined as the current state matching a previous state that was within a predetermined number of actions from a failed state, e.g., all states within two previous time stamps and/or performed actions of a failed state may also be determined to be "dangerous" or "failed" states within the mapping 600.

With state information and information about what actions led to failed states, a developer can more easily understand how to solve an issue. For example, if the "failed" state has 100% CPU utilization, a suggestion may be output to a developer suggesting scaling out the microservice or increase CPU power of the microservice. If such an action is not possible, e.g., due to cost constraints, the system and/or the developer can examine the mapping to determine the actions led to the "failed" state. These actions may thereafter be restricted out when a microservice is in a dangerous state. Moreover, using information of the mapping 600, a production system can be monitored with the same instrumentation so that the state of each microservice in the production system is recorded. With this information, the state of a microservice in the production system could be compared to all "dangerous" and "failed" states that were found during testing. When the production system enters into one of these states, the developer may be notified to remediate the problem.

FIG. 7A depicts a matrix 700 and FIG. 7B depicts a table 720, in accordance with several embodiments. As an option, the present matrix 700 and table 720 may be implemented in conjunction with features from any other embodiment listed herein, such as those described with reference to the other Figs. Of course, however, such matrix 700 and table 720 and others presented herein may be used in various applications and/or in permutations which may or may not be specifically described in the illustrative embodiments listed herein. Further, the matrix 700 and table 720 presented herein may be used in any desired environment.

Referring first to FIG. 7A, the matrix 700 includes a collection of information of states of microservices of a system. For example, the matrix may include information detailing the states of microservices after a failure event caused by shutting down or scaling the microservices to zero in order to cause the failure event. This may cause an appearance as if the microservice no longer exists, e.g., from a perspective of the system. During this downtime of the microservice, the information of the states is preferably collected for creating the matrix 700.

Referring now to FIG. 7B, the table 720 includes failure effect data. For example, the table 720 includes matrices of states of microservices of a system, e.g., see System Matrix, and determined root causes of a microservice system failure, e.g., see Root Cause Container identifying microservice 5 as the root cause of a caused failure event. In table 720, microservice 5 is intentionally failed in order to determine states of the system matrix that can thereafter be used, e.g., for matrix comparisons, to identify a root cause of a failure occurring in an online and/or production environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
causing a failure event in each of a plurality of microservices of a system;
collecting failure effect data associated with the caused failure events;
creating a mapping detailing transition of the microservices between different states, wherein the collected failure effect data is analyzed for creating the mapping, wherein creating the mapping includes executing a reinforcement learning algorithm;
in response to a determination that a first of the microservices is close to experiencing a predicted failure event, outputting a predetermined notification; and
in response to a determination that the system has failed, using the mapping to identify a root cause of the system failure, and outputting a suggested solution for repairing the system, wherein using the mapping to identify the root cause of the system failure includes identifying the microservices that caused the system failure.

2. The computer-implemented method of claim 1, wherein the failure effect data indicates the states of each of the microservices after each of the caused failure events, wherein identifying the microservices that caused the system failure includes comparing the states of each of the microservices in the failure effect data with states of the microservices after the system failure.

3. The computer-implemented method of claim 2, wherein the state of at least one of the microservices after a caused failure event matching the state of a second of the microservices after the system failure identifies the second microservice as having caused the system failure.

4. The computer-implemented method of claim 1, comprising: instructing a forced micro-reset of the first microservice in response to the determination that the first microservice is close to experiencing the predicted failure event.

5. The computer-implemented method of claim 1, wherein the determination that the first microservice is close to experiencing the predicted failure event is based on the collected failure effect data and includes comparing a current state of the first microservice to potential actions of the first microservice previously determined to cause the first microservice to change to a different state.

6. The computer-implemented method of claim 1, comprising: identifying avoidance of a failure event by one of the microservices; and logging information detailing the failure event avoidance and success rates of the failure event avoidance.

7. The computer-implemented method of claim 1, wherein the reinforcement learning algorithm analyses the collected failure effect data to create the mapping showing how the microservices move between the states.

8. The computer-implemented method of claim 1, wherein the suggested solution includes a summary of the identified root cause of the system failure.

9. A computer program product, the computer program product comprising a computer readable storage medium having program instructions embodied therewith, the program instructions readable and/or executable by a computer to cause the computer to:
cause, by the computer, a failure event in each of a plurality of microservices of a system;
collect, by the computer, failure effect data associated with the caused failure events;
create, by the computer, a mapping detailing transition of the microservices between different states, wherein the collected failure effect data is analyzed for creating the mapping, wherein creating the mapping includes executing a reinforcement learning algorithm;
in response to a determination that a first of the microservices is close to experiencing a predicted failure event, output, by the computer, a predetermined notification; and
in response to a determination that the system has failed, use, by the computer, the mapping to identify a root cause of the system failure, and output, by the computer, a suggested solution for repairing the system, wherein using the mapping to identify the root cause of the system failure includes identifying the microservices that caused the system failure.

10. The computer program product of claim 9, wherein the failure effect data indicates the states of each of the microservices after each of the caused failure events, wherein identifying the microservices that caused the system failure includes comparing the states of each of the microservices in the failure effect data with states of the microservices after the system failure.

11. The computer program product of claim 10, wherein the state of at least one of the microservices after a caused failure event matching the state of a second of the microservices after the system failure identifies the second microservice as having caused the system failure.

12. The computer program product of claim 9, wherein the reinforcement learning algorithm analyses the collected failure effect data to create the mapping showing how the microservices move between the states, and the program instructions readable and/or executable by the computer to cause the computer to:
instruct, by the computer, a forced micro-reset of the first microservice in response to the determination that the first microservice is close to experiencing the predicted failure event.

13. The computer program product of claim 9, wherein the determination that the first microservice is close to experiencing the predicted failure event is based on the collected failure effect data and includes comparing a current state of the first microservice to potential actions of the first microservice capable of causing the first microservice to change to a different state.

14. The computer program product of claim 9, the program instructions readable and/or executable by the computer to cause the computer to:
identify, by the computer, avoidance of a failure event by one of the microservices; and
log, by the computer, information detailing the failure event avoidance and success rates of the failure event avoidance.

15. A system, comprising:
a processor; and
logic integrated with the processor, executable by the processor, or integrated with and executable by the processor, the logic being configured to:
cause a failure event in each of a plurality of microservices of the system;
collect failure effect data associated with the caused failure events;

create a mapping detailing transition of the microservices between different states, wherein the collected failure effect data is analyzed for creating the mapping, wherein creating the mapping includes executing a reinforcement learning algorithm;

in response to a determination that a first of the microservices is close to experiencing a predicted failure event, output a predetermined notification; and in response to a determination that the system has failed, use the mapping to identify a root cause of the system failure, and output a suggested solution for repairing the system, wherein using the mapping to identify the root cause of the system failure includes identifying the microservices that caused the system failure.

16. The system of claim 15, wherein the failure effect data indicates the states of each of the microservices after each of the caused failure events, wherein identifying the microservices that caused the system failure includes comparing the states of each of the microservices in the failure effect data with states of the microservices after the system failure.

17. The system of claim 16, wherein the state of at least one of the microservices after a caused failure event matching the state of a second of the microservices after the system failure identifies the second microservice as having caused the system failure.

18. The system of claim 15, the logic being configured to: instruct a forced micro-reset of the first microservice in response to the determination that the first microservice is close to experiencing the predicted failure event.

19. The system of claim 15, wherein the determination that the first microservice is close to experiencing the predicted failure event is based on the collected failure effect data and includes comparing a current state of the first microservice to potential actions of the first microservice capable of causing the first microservice to change to a different state.

20. The system of claim 15, the logic being configured to: identify avoidance of a failure event by one of the microservices; and log information detailing the failure event avoidance and success rates of the failure event avoidance.

* * * * *